United States Patent
Encarthe et al.

[11] Patent Number: 6,029,931
[45] Date of Patent: Feb. 29, 2000

[54] AIRCRAFT LANDING GEAR ELEMENT WITH MECHANICALLY SLEWABLE UNDERCARRIAGE AND AXLES

[75] Inventors: Philippe Encarthe, Toulouse; Benoît Hemadou, Tournefeuille; Claude Menel, Montauban, all of France

[73] Assignee: Aerospatiale Societe Nationale Industrielle, France

[21] Appl. No.: 09/125,205

[22] PCT Filed: Dec. 24, 1997

[86] PCT No.: PCT/FR97/02427

§ 371 Date: Aug. 13, 1998

§ 102(e) Date: Aug. 13, 1998

[87] PCT Pub. No.: WO82/29304

PCT Pub. Date: Jul. 9, 1998

[30] Foreign Application Priority Data

Dec. 26, 1996 [FR] France .................................. 96 16096

[51] Int. Cl.[7] .................................................. B64C 25/50
[52] U.S. Cl. .......................... 244/50; 180/140; 180/152; 280/24.1
[58] Field of Search ................................. 244/100 R, 50, 244/103 W, 103 R, 102 R; 180/152, 140, 141, 143; 280/97, 81.5, 24.1

[56] References Cited

U.S. PATENT DOCUMENTS 2,538,388  1/1951  Sievers .
2,630,285  3/1953  Geisse .................................. 244/103 W
3,643,898  2/1972  Whitener et al. .
5,242,131  9/1993  Watts ...................................... 180/152
5,513,821  5/1996  Ralph ..................................... 180/143
5,947,414  9/1999  Ralph ..................................... 244/50

FOREIGN PATENT DOCUMENTS 0 713 826  5/1996  European Pat. Off. .
1 554 174  9/1968  France .
WO9617771  6/1996  WIPO .

*Primary Examiner*—Galen L. Barefoot
*Attorney, Agent, or Firm*—Burns, Doane, Swecker & Mathis, L.L.P.

[57] ABSTRACT

An element (14) of a swivelling aircraft landing gear, such as an element of the swivelling, rear or tail gear of a wide-body aircraft, equipped with a swivelling, front or nose gear and a non-swivelling, underwing gear, has a swivelling truck (16) carrying a swivelling, front axle (20) and a swivelling, rear axle (22). The orientation of each of these axles is respectively ensured by two linkages (44–49), which are independent of one another and connected to a non-rotary, fixed support (30) carrying the truck (16), in such a way that the axes (Y1, Y2) of the front (20) and rear (22) axles and the axis of the truck (16) intersect at the instantaneous rotation center of the aircraft.

10 Claims, 3 Drawing Sheets

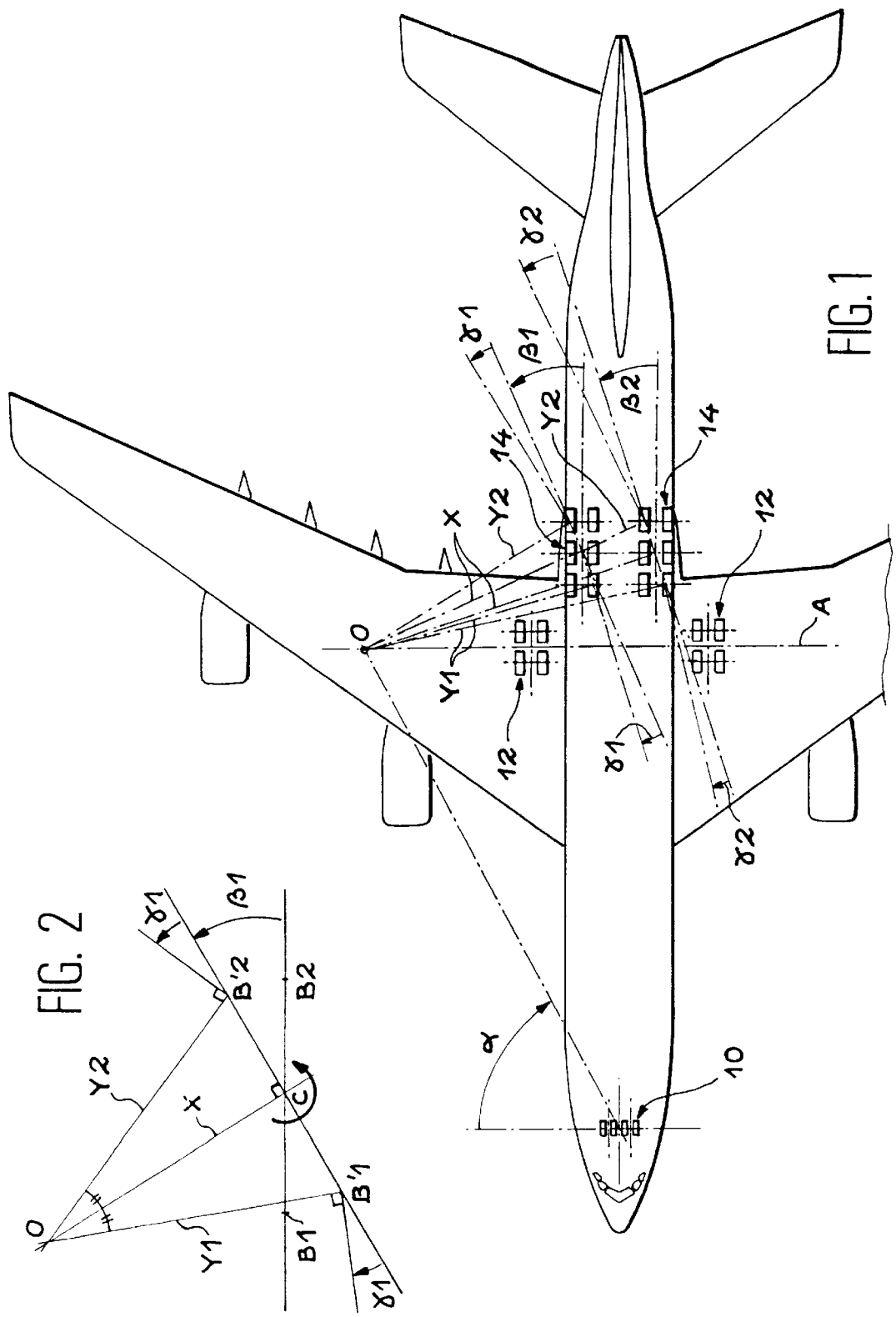

AIRCRAFT LANDING GEAR ELEMENT WITH MECHANICALLY SLEWABLE UNDERCARRIAGE AND AXLES

DESCRIPTION 1. Technical Field

The invention relates to a truck-equipped landing gear element having mechanically swivelling axles for an aircraft.

The invention is more particularly directed at an element of a tail landing gear, which can equip a wide-body aircraft having a swivelling, nose gear, an underwing gear and a tail gear installed under the fuselage. 2. Prior Art On most existing airliners, the landing gear comprises a swivelling, nose gear and a non-swivelling, underwing gear formed from two elements generally placed beneath the wings when the gear is extended. When an aircraft equipped with a landing gear of this type is on the ground, it turns about an instantaneous rotation center permanently located on the axis of the underwing gear.

On the largest aircraft, the very high load supported by the landing gear, particularly at the instant when the aircraft touches the ground, leads to an increase in the number of wheels by adding to the non-swivelling, underwing gear a tail gear formed by two elements installed beneath the fuselage. So as not to unduly increase the turning radius of the aircraft on the ground and so as to avoid accelerated wear to the tires, the trucks forming each of the elements of the tail gear are then rendered swivellable under certain conditions. These conditions impose that the aircraft is on the ground, that the speed of the wheels is low (e.g. below approximately 28 km/h), but not zero and that the turning angle of the nose gear exceeds a certain limit (e.g. approximately 20°).

In this type of landing gear, which is in particular found on the Boeing 747, the orientation of the trucks forming the tail gear located beneath the fuselage, is hydraulically controlled by jacks or rams, in accordance with values proportional to the turning angle of the nose gear, so that the axes of each of the swivelling trucks, as well as the axis of the nose gear are concurrent at the same point, located on the axis of the underwing gear, said point forming the instantaneous rotation center.

As a result of this arrangement, the turning radius is reduced, which enables the aircraft to turn more efficiently. Moreover, the orientation of the trucks of the tail gear placed beneath the fuselage makes it possible to reduce skidding of the tires and consequently wear thereto.

However, this known procedure does not completely eliminate the skidding of the tires of the tail gear placed beneath the fuselage, particularly when each element of said train has more than two axles. The wear to the tires is reduced, but still persists.

DESCRIPTION OF THE INVENTION

The invention specifically relates to a swivelling landing gear element incorporating a mechanism, by means of which the orientation of the truck is accompanied by a simultaneous orientation of the front and rear axles of each of the elements of said gear, so that the aircraft can make a close turn and the skidding of the tires, leading to premature wear thereto, is avoided.

For this purpose, the present invention proposes an element of an aircraft landing gear, comprising a truck having at least two axles and means for pivoting said truck about a central axis, oriented substantially vertically when the aircraft is on the ground, characterized in that the truck has a front axle and a rear axle able to respectively pivot about a front axis and a rear axis, parallel to the central axis and positioned symmetrically on either side of said central axis, a pivoting control means acting mechanically on each of the front and rear axles, so that the pivoting of the truck about the central axis has as simultaneous effects a pivoting in the opposite direction of the front axle and a pivoting in said same direction of the rear axle, respectively about the front and rear axes.

Preferably, the pivoting control means is designed in such a way that the pivoting of the front and rear axles has the same amplitude, less than that of the pivoting of the truck about the central axis.

In a preferred embodiment of the invention, the pivoting control means is completely mechanical and comprises a front linkage and a rear linkage, which are independent of one another, both being connected to a non-rotary, fixed support part carrying the truck.

The front and rear linkages then respectively comprise front and rear rudder bars, articulated on the truck between the central axis and the front and rear axes, first front and rear rods, articulated between the support part and the front and rear rudder bars, and second front and rear rods, articulated between the front and rear rudder bars and the front and rear axles.

More specifically, the front and rear rudder bars are articulated on the truck by intermediate, front and rear spindles, arranged symmetrically with respect to the central axis, in a first plane containing the central, front and rear axes and oriented parallel to said axes.

According to a preferred arrangement, the first, front and rear rods are then entirely located on the same side of the first plane and symmetrically with respect to a second plane perpendicular to the first plane and passing through the central axis when the truck has not pivoted about the central axis. The second front rod is then located entirely on one side of the first plane, opposite to that containing the first, front and rear rods and the second rear rod traverses the first plane.

In each of the front and rear linkages, the first rod and the second rod are articulated on two sections of the rudder bar on either side of the intermediate axis, so as to be oriented in directions substantially perpendicular to the orientation directions of said sections, when the truck has not pivoted about the central axis.

In a comparable manner, the second front and rear rods are respectively articulated on the front and rear axles by means of front and rear shackles, oriented in directions substantially perpendicular to the second front and rear rods, when the truck has not pivoted about the central axis.

In a particular embodiment of the invention, the truck also supports a fixed, central axle, oriented in a direction perpendicular to the central axis.

Moreover, the means for pivoting the truck about the central axis advantageously incorporate rams acting on the truck by means of rack and pinion mechanisms.

BRIEF DESCRIPTION OF THE DRAWINGS

The invention is described in greater detail hereinafter relative to non-limitative embodiments and with reference to the attached drawings, wherein show:

FIG. 1 A plan view diagrammatically representing an aircraft equipped with a landing gear according to the invention.

FIG. 2 A diagram illustrating the determination of the turning angles of the truck and the front and rear axles of the right-hand element of the tail gear of the aircraft according to FIG. 1, when the nose gear is turned to the right by an angle α.

DETAILED DESCRIPTION OF A PREFERRED EMBODIMENT

Figure 3:
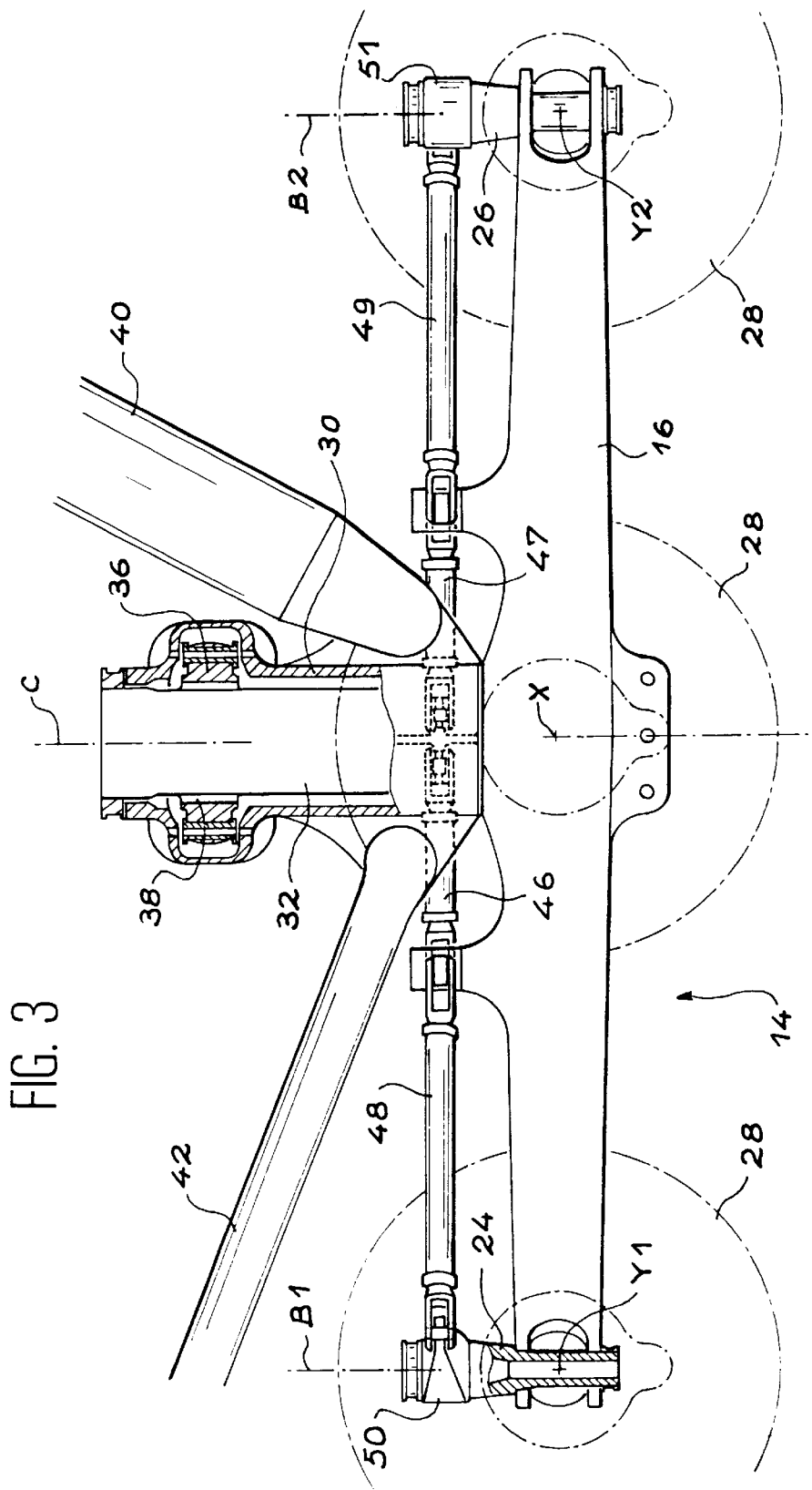
FIG. 3 A side view of one of the elements of the tail gear, beneath the fuselage, of the aircraft of FIG. 1.

FIG. 1 shows in plan view a wide-body aircraft, whose landing gear comprises a nose gear 10 and a main gear formed by two underwing elements 12 and two tail elements 14.

In conventional manner, the nose gear 10, placed in a central position beneath the front tip of the fuselage, can be swivelled. In the embodiment illustrated in exemplified manner, said nose gear 10 is constituted by a single axle with four wheels.

The elements 12 of the underwing gear are non-swivellable and are generally positioned beneath the aircraft wings, when the landing gear is extended. In the illustrated embodiment, each element 12 comprises two axles, each equipped with two wheels.

According to the invention, each of the elements 14 of the tail gear of the aircraft can be swivelled, as can the front and rear axles of said elements.

In the embodiment shown, each of the elements 14 of the rear or tail ear has three axles with two wheels comprising a fixed, central axle and a front axle and a rear axle, which can be oriented. As a variant, it should be noted that each of the elements 14 may only have two axles with two wheels, said two axles then constituting the front axle and rear axle, which can be swivelled in accordance with the invention. Conversely, each of the tail gear elements 14 can have more than three axles. In all cases, the number of wheels carried by each axle can exceed two, without passing beyond the scope of the invention.

If A is used for designating the underwing gear geometrical axis when the landing gear is extended, the instantaneous rotation center 0 of the aircraft on the ground is still located on said axis A. More specifically, FIGS. 1 and 2 show in exemplified manner the location of the instantaneous rotation center 0 in the case where the front gear 10 is turned to the right by an angle α.

For the following description, reference is advantageously made to the diagram of FIG. 2, which relates to the right-hand element 14 of the tail gear. With different turning angle values, a comparable diagram can be plotted for the left-hand element 14 of the tail gear.

According to the invention, when the nose gear 10 is turned to the right by the angle α, the right and left-hand elements 14 of the tail gear are oriented to the left, respectively by an angle β1 and an angle β2. These angles β1 and β2 are determined in such a way that the transverse, geometrical axes X of the right and left-hand elements 14 are concurrent at a point coinciding with the instantaneous rotation center 0.

Moreover, the front and rear axles of each of the elements 14 are then respectively oriented to the right and left by the same angle γ1 for the right-hand element and the same angle γ2 for the lefthand element. The values of said angles γ1 and γ2 are determined in such a way that the axes Y1 and Y2 of each of the front and rear axles oriented in this way are also concurrent at a same point coinciding with the instantaneous rotation center 0 of the aircraft.

In practice, the orientation angles β1 and β2 of each of the elements 14 are calculated proportionally to the orientation angle α of the nose gear 10 of the aircraft. As will be shown hereinafter, the orientation angles γ1 and γ2 of the front and rear axles of each of the elements 14 are automatically determined by mechanisms integrated into said elements.

The two elements 14 of the tail gear of the aircraft diagrammatically illustrated in FIG. 1 have an identical structure. The detailed description of one of these elements 14 given hereinafter with reference to FIGS. 3 and 4 will consequently also apply to the other element 14 of the tail gear.

Figure 4:
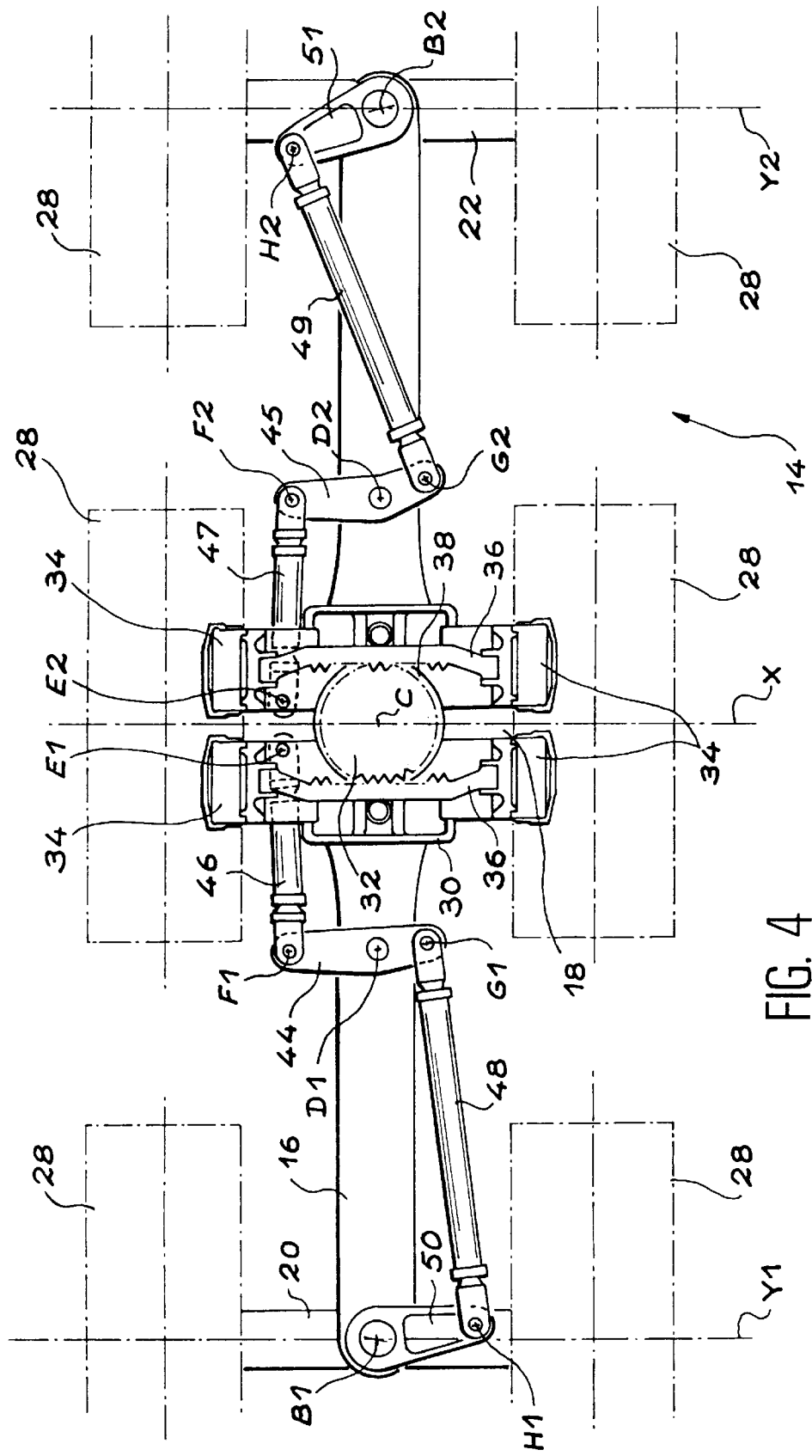
FIG. 4 A plan view of the element illustrated in FIG. 3.

The tail gear element 14 illustrated in FIGS. 3 and 4 comprises a beam-like truck 16, which supports a central axle 18, a front axle 20 and a rear axle 22.

The central axle 18 is supported in a rotary and non-swivellable manner by a larger cross-section, central portion of the truck 16. The geometrical axis of the central axle 18 coincides with the transverse axis X of the element 14, which passes through the instantaneous rotation center 0 of the aircraft on the ground, as explained relative to FIGS. 1 and 2.

However, the front 20 and rear 22 axles are installed at each of the ends of the truck 16, so as to be able to pivot about a front axis B1 and a rear axis B2, which are parallel to one another. These axes B1 and B2 are vertically oriented when the aircraft is on the ground. They are materialized by shafts 24 and 26, respectively integral with the axles 20 and 22 and supported in pivoting manner by each of the ends of the truck 16.

In the embodiment shown, each of the axles 18, 20 and 22 has two wheels equipped with tyres 18.

Each of the landing gear elements 14 also incorporates a fixed, non-rotary, support part 30 carrying the truck 16. According to the invention, means are interposed between said support part 30 and the truck 16 in order to pivot the latter about a central axis C equidistant of the front B1 and rear B2 axes and oriented parallel to said axes. This central axis C intersects the transverse, geometrical axis X of the central axle 18 and is perpendicular thereto. The central axis C is materialized on the truck 16 by a column 32, which projects upwards on the central portion of the truck and penetrates a tubular portion of the support part 30. More specifically, the cooperation between the column 32 and the support part 30 is such that the truck 16 can pivot about the central axis C, whilst being carried by the support part 30.

In order to ensure the control of the pivoting of the truck 16 about the axis C, the support part 30 is equipped with two groups of opposed jacks or rams 34 (FIG. 4). Each of the opposed ram groups controls the displacement of a rack 36 oriented tangentially to the column 32, in a direction parallel to the geometrical axis X, when the truck has not pivoted about the central axis C. The two racks 36 engage on a pinion 38 integral with the column 32.

As a function of whether the opposed rams 34 are actuated in a first direction or an opposing direction, the truck 16 pivots to the right or left under the action of the rack and pinion mechanism 36, 38. As illustrated in FIG. 2, the pivoting of the truck 11 about the axis C has the effect of moving the axes B1 and B2 to B'1 and B'2.

In conventional manner, the support part 30 carrying the truck 16 is connected to the aircraft structure by a mechanism having articulated arms, by means of which the assembly 14 can be extended and retracted into a not shown recess, provided for this purpose in the aircraft fuselage. This articulated arm mechanism is well known in the art and does not form part of the invention. As illustrated in FIG. 3, it comprises a rear absorber arm 40 and a front brace strut 42, whose ends are articulated on the support part 30 respectively to the rear and front of the axis C.

According to the invention, a pivoting control means is provided for acting on each of the front 20 and rear 22 axles, so that a pivoting of the truck 16 about the central axis C has the effect of a pivoting in the opposite direction of the front axle 20 and a pivoting in the same direction of the rear axle 22, respectively about the front B1 and rear B2 axes.

More specifically, said pivoting control means comprises a front linkage and a rear linkage, both of which are connected to the support part 30 and positioned in such a way that the pivoting of the front 20 and rear 22 axles have the same amplitude, less than that of the truck 16 about the central axis C.

As is more particularly illustrated in FIG. 4, the front linkage comprises a front rudder bar 44, articulated to the truck 16 by a front, intermediate spindle D1, parallel to the axes C, B1 and B2 and located in the same plane P as said axes, between the central axis C and the front axis B1.

The front linkage also comprises a first, front rod 46 interposed between the support part 30 and the front rudder bar 44 and a second, front rod 48, interposed between the front rudder bar 44 and a shackle 50 integral with the shaft 24 connected to the front axle 20.

More specifically, the structure of the front linkage is such that the first, front rod 46 is entirely located on one side of the plane P and the second, front rod 48 is entirely located on the other side of the plane P. Moreover, when the axes of the front 20 and rear 22 axles are oriented substantially perpendicular to said plane, as illustrated in FIG. 4, i.e. when the truck 16 has not pivoted, about the central axis C, the first, front rod 46 is oriented substantially parallel to the plane P.

The ends of the first, front rod 46 are respectively articulated on the fixed, support part 30 and on a first end of the front rudder bar 44 by spindles E1 and F1. In a comparable manner, the ends of the second, front rod 48 are respectively articulated on the opposite end of the front rudder bar 44 and on the end of the shackle 50 by spindles G1 and H1. The spindles E1, F1, G1 and H1 are all parallel to the axes C, B1, B2 and D1.

In order that the transmission of forces takes place under optimum conditions, the first, front rod 46 and the first, second rod 48 are articulated on sections of the front rudder bar 44 on either side of the front, intermediate axis D1 in directions substantially perpendicular to the orientation directions of each of said sections, when the truck 16 has not pivoted about the central axis. For the same reason, under the same orientation conditions of the truck 16, the front shackle 50 is oriented in a direction substantially perpendicular to the second, front rod 48.

The rear linkage, which connects the support part 30 to the shaft 26 integral with the rear axle 22, has a configuration very comparable to that of the front linkage.

Thus, the rear linkage has a rear rudder bar 45, articulated on the truck 16 by a rear, intermediate spindle D2, interposed between the central axis C and the rear axis B2, located in the same plane P as said axes and oriented parallel thereto. The intermediate axes D1 and D2 are arranged symmetrically on either side of the central axis and are closer to said axis C than the front B1 and rear B2 axes.

The rear linkage also has a first, rear rod 47 connecting the rear rudder bar 45 to the fixed, support part 30 and a second, rear rod 49 connecting the rear rudder bar 45 to a shackle 51 integral with the shaft 26 and linked with the rear axle 22.

The first, rear rod 47 is entirely located on the same side of the plane P as the first, front rod 46 and it is oriented substantially parallel to said plane when the truck 16 has not pivoted, as illustrated in FIG. 4. More specifically, the first, front 46 and rear 47 rods are then arranged substantially symmetrically with respect to a median plane of the truck 16 passing through the central axis C and oriented parallel to the plane P.

However, the second, rear rod 49 has an orientiaton different from that of the second, front rod 48. More specifically, the second, rear rod 49 traverses the plane P. The effect of this arrangement is to control pivoting actions with an identical amplitude, but in opposite directions of the front 20 and rear 22 axles.

The ends of the first, rear rod 47 are respectively articulated on the fixed, support part 30 and on a first end of the rear rudder bar 45 by spindles E2 and F2. In the same way, the ends of the second, rear rod 49 are respectively articulated on the other end of the rear rudder bar 45 and on the end of the shackle 51 by spindles G2 and H2. The spindles E2, F2, G2 and H2 are also parallel to the axes C, B1, B2, D1 and D2.

In order to ensure a maximum efficiency transmission of forces, the first, rear rod 4 and the second, rear rod 49 are oriented in directions substantially perpendicular to the orientation directions of the two sections of the rear rudder bar 45 on which said rods are articulated, when the truck has not pivoted about the central axis C. For the same reason and under the same conditions, the second, rear rod 49 is also oriented in a direction substantially perpendicular to the rear shackle 51.

It is clear that by giving to the different lever arms of the thus formed, front and rear linkages, appropriate values, a pivoting of the truck 16 about the central axis C automatically leads to pivoting actions in two opposed directions of the front 20 and rear 22 axles about the axes B1 and B2. Moreover, the amplitudes of said pivoting actions are such that the concurrent character of the axes X, Y1 and Y2 at the instantaneous rotation center 0, explained hereinbefore relative to FIGS. 1 and 2, is obtained.

Obviously, although the linkage mechanism described hereinbefore constitutes a preferred embodiment of the invention, the control of the pivoting of the front and rear axles can also be ensured in a different way, particularly by rack and pinion mechanisms, without passing outside the scope of the invention.

We claim:

1. Element of an aircraft landing gear, comprising a truck having at least two axles and means for pivoting said truck about a central axis, oriented substantially vertically when the aircraft is on the ground, wherein the truck has a front axle and a rear axle able to respectively pivot about a front axis and a rear axis, parallel to the central axis and positioned symmetrically on either side of said central axis, a pivoting control means acting mechanically on each of the front and rear axles, so that the pivoting of the truck about the central axis has as simultaneous effects a pivoting in the opposite direction of the front axle and a pivoting in said same direction of the rear axle, respectively about the front and rear axes.

2. Landing gear element according to claim 1, wherein the pivoting control mens is designed in such a way that the pivoting actions of the front axle and rear axle have the same amplitude, smaller than that of the pivoting of the truck about the central axis.

3. Landing gear element according to claim 1, wherein the pivoting control means comprises a front linkage and a rear linkage, which are independent of one another, both being connected to a non-rotary, fixed, support part carrying the truck.

4. Landing gear element according to claim 3, wherein the front and rear linkages respectively incorporate front and rear rudder bars, articulated to the truck between the central axis and the front and rear axes, first, front and rear rods, articulated between the support part and the front and rear rudder bars, and second, front and rear rods, articulated between the front and rear rudder bars and the front and rear axles.

5. Landing gear element according to claim 4, wherein the front and rear rudder bars are articulated to the truck by intermediate, front and rear spindles, arranged symmetrically with respect to the central axis, in a first plane containing the central, front and rear axes and oriented parallel to said axes.

6. Landing gear element according to claim 5, wherein the first, front and rear rods are entirely located on the same side of the first plane and symmetrically with respect to a second plane, perpendicular to the first plane and passing through the central axis, when the truck has not pivoted about said axis, the second, front rod being entirely located on the same side of the first plane, opposite to that containing the first, front and rear rods, and the second, rear rod traversing the first plane.

7. Landing gear element according to claim 5, wherein, in each of the front and rear linkages, the first rod and the second rod are articulated on two sections of the rudder bar, located on either side of the intermediate axis, so as to be oriented in directions substantially perpendicular to the orientation directions of said sections, when the truck has not pivoted about the central axis.

8. Landing gear element according to claim 4, wherein the second, front and rear rods are respectively articulated on front and rear axles by means of front and rear shackles, oriented in directions substantially perpendicular to the second, front and rear rods, when the truck has not pivoted about the central axis.

9. Landing gear element according to claim 1, wherein the truck also supports a fixed, central axle, oriented in a direction perpendicular to the central axis.

10. Landing gear element according to claim 1, wherein the means for pivoting the truck about the central axis comprise rams acting on the truck by means of rack and pinion mechanisms.

* * * * *